(12) United States Patent
Ovares et al.

(10) Patent No.: US 10,190,622 B2
(45) Date of Patent: Jan. 29, 2019

(54) WEAR RESISTANT COATING APPLIED TO CONNECTING ROD SURFACES

(71) Applicant: FEDERAL-MOGUL CORPORATION, Southfield, MI (US)

(72) Inventors: Paul Matthew Ovares, Brownstown, MI (US); James R. Toth, Ann Arbor, MI (US)

(73) Assignee: Tenneco Inc., Lake Forest, IL (US)

( * ) Notice: Subject to any disclaimer, the term of this patent is extended or adjusted under 35 U.S.C. 154(b) by 56 days.

(21) Appl. No.: 14/710,918

(22) Filed: May 13, 2015

(65) Prior Publication Data
US 2016/0123381 A1 May 5, 2016

Related U.S. Application Data

(60) Provisional application No. 62/074,340, filed on Nov. 3, 2014, provisional application No. 62/074,892, filed on Nov. 4, 2014.

(51) Int. Cl.
| | |
|---|---|
| *F16C 7/02* | (2006.01) |
| *B05D 1/02* | (2006.01) |
| *B05D 1/18* | (2006.01) |
| *B05D 1/28* | (2006.01) |
| *C23C 26/00* | (2006.01) |
| *F16J 1/16* | (2006.01) |

(Continued)

(52) U.S. Cl.
CPC ............... *F16C 7/023* (2013.01); *B05D 1/02* (2013.01); *B05D 1/18* (2013.01); *B05D 1/28* (2013.01); *C23C 26/00* (2013.01); *F16C 17/246* (2013.01); *F16J 1/16* (2013.01); *F16J 7/00* (2013.01); *F16C 2202/54* (2013.01); *F16C 2204/60* (2013.01); *F16C 2208/20* (2013.01); *F16C 2223/30* (2013.01)

(58) Field of Classification Search
CPC .... B05D 1/02; B05D 1/18; B05D 1/28; F16C 7/023; F16C 9/04; F16J 1/12; F16J 1/16; F16J 7/00; C23C 26/00
See application file for complete search history.

(56) References Cited

U.S. PATENT DOCUMENTS

| | | | | |
|---|---|---|---|---|
| 4,873,951 | A | * | 10/1989 | Garthwaite ........... F02B 75/007 123/196 W |
| 6,513,238 | B1 | * | 2/2003 | Schlegel ................. F16C 7/023 29/888.09 |

(Continued)

*Primary Examiner* — Thomas C Diaz
(74) *Attorney, Agent, or Firm* — Robert L Stearns; Dickinson Wright, PLLC

(57) ABSTRACT

A wear resistant coating is applied to the thrust surfaces and bore surfaces of a connecting rod. The wear resistant coating includes a polymer matrix, such as polyamide imide (PAI), solid lubricant, and hard particles including $Fe_2O_3$. The wear resistant coating is typically applied by spraying or rolling. The wear resistant coating adheres well to metal and provides lubrication. Thus, the wear resistant coating can reliably reduce wear, scuff, and seizure along the surfaces of the connecting rod as the piston reciprocates and crank shaft rotates during operation of the internal combustion engine. The likelihood of engine contamination caused by metal shavings from wear of the connecting rod is reduced, and the life of the connecting rod and engine is increased.

6 Claims, 1 Drawing Sheet

(51) Int. Cl.
*F16J 7/00* (2006.01)
*F16C 17/24* (2006.01)

(56) References Cited

U.S. PATENT DOCUMENTS

| | | | |
|---|---|---|---|
| 6,923,153 B2 * | 8/2005 | Rein | ................ B22F 5/008 123/193.6 |
| 8,119,577 B2 | 2/2012 | Stecher | |
| 2011/0268944 A1 | 11/2011 | Achim | |
| 2012/0114971 A1 | 5/2012 | Andler | |
| 2013/0220115 A1 | 8/2013 | Kantola | |
| 2014/0235513 A1 | 8/2014 | Kverel | |
| 2014/0272188 A1 | 9/2014 | Reinhard | |

\* cited by examiner

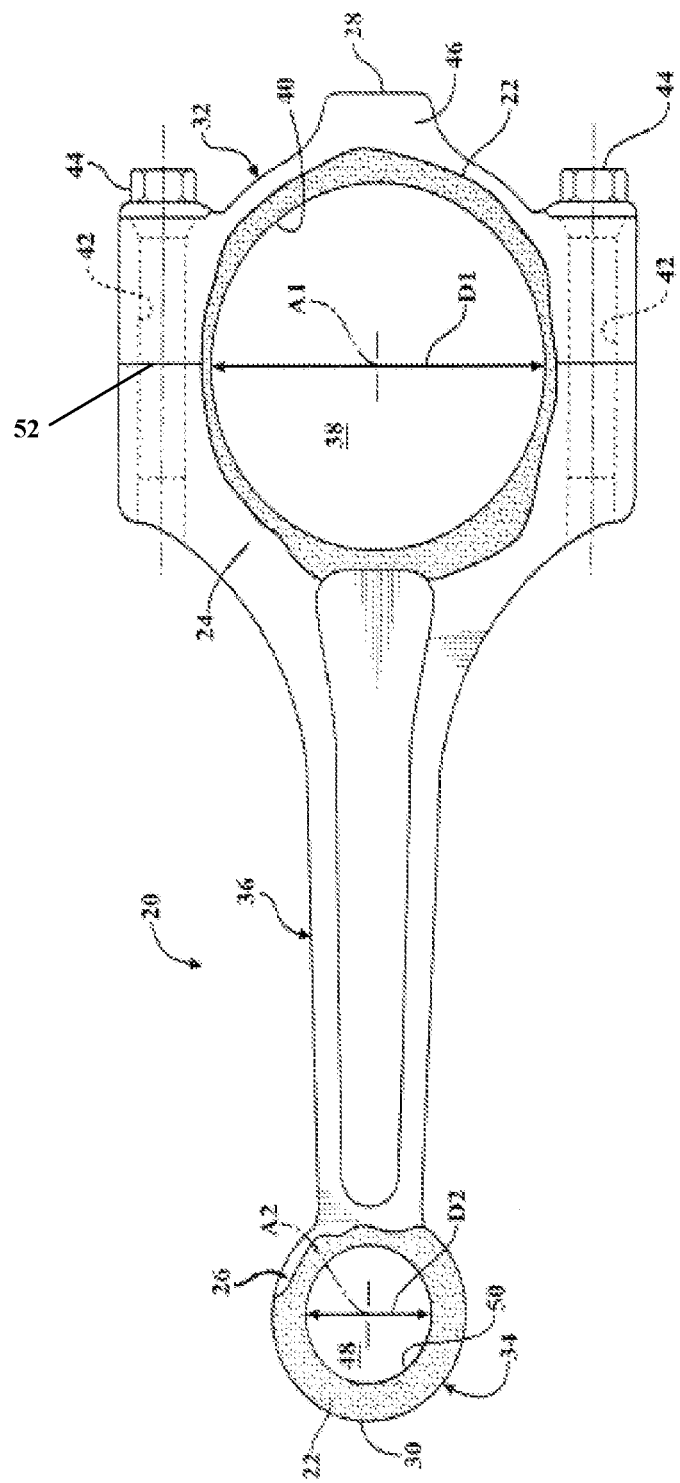

WEAR RESISTANT COATING APPLIED TO CONNECTING ROD SURFACES

CROSS REFERENCE TO RELATED APPLICATION

This application claims the benefit of U.S. provisional patent application Ser. No. 62/074,340, filed Nov. 3, 2014 and U.S. provisional patent application Ser. No. 62/074,892, filed Nov. 4, 2014, the entire contents of which are incorporated herein by reference.

BACKGROUND OF THE INVENTION

1. Field of the Invention

This invention relates generally to a connecting rod for connecting a piston to a crankshaft of internal combustion engine, a wear protection coating applied to the connecting rod, and methods of manufacturing the same.

2. Related Art

A connecting rod is used in an internal combustion engine to connect a piston to a crankshaft. The connecting rod converts reciprocating motion from the piston into rotating motion of the crankshaft. The connecting rod generally includes a body formed of metal extending longitudinally between a large end and a small end. The large end of the connecting rod defines a large bore for receiving the crankshaft. The large end also presents a large thrust surface surrounding the large bore. The small end of the connecting rod defines a small bore for receiving a wrist pin, and the wrist pin extends through pin bosses of the piston. The small end presents a small thrust surface surrounding the small bore.

As the piston reciprocates and the crankshaft rotates during operation of the engine, the thrust surfaces and bores of the connecting rod are subject to wear caused by contact with the piston, bearings, and other components. In order to reduce wear, the material used to form the connecting rod may be subjected to a hardening or shot peening process. The surfaces of the connecting rod can also be coated in order to reduce wear. Examples of wear resistant coatings which have been used include a metal-sprayed coating, such as a molybdenum alloy, or a hard coating, such as chromium nitride. However, there remains a need for improved wear resistance of the thrust surfaces and bores of the connecting rod.

SUMMARY OF THE INVENTION

One aspect of the invention provides a connecting rod for connecting a piston to a crankshaft of an internal combustion engine. The connecting rod comprises a body formed of metal extending longitudinally from a first end to a second end. The body includes a first thrust portion adjacent the first end, a second thrust portion adjacent the second end, and a stem connecting the first thrust portion to the second thrust portion. The first thrust portion includes a pair of first thrust surfaces facing opposite one another and encircling a first bore for receiving the crankshaft. The second thrust portion includes a pair of second thrust surfaces facing opposite one another and encircling a second bore for receiving a wrist pin coupled to the piston. A wear resistant coating is applied to at least one of the thrust surfaces. The wear resistant coating includes polymer, solid lubricant, and particles formed of $Fe_2O_3$.

Another aspect of the invention provides a method of manufacturing the connecting rod for connecting the crankshaft to the piston of the internal combustion engine. The method comprises the steps of providing the body formed of metal, and applying the wear resistant coating to at least one of the thrust surfaces of the body.

The wear resistant coating provides lubrication between the at least one thrust surface of the connecting rod and the components which contact the connecting rod as the piston reciprocates and crank shaft rotates during operation of the internal combustion engine. Test results show that the wear resistant coating provides exceptional adhesion to the metal thrust surfaces. The test results also suggest that the wear resistant coating can reliably reduce wear, scuff, and seizure along the thrust surfaces of the connecting rod. Thus, the likelihood of engine contamination caused by metal shavings from wear of the connecting rod is reduced, and the life of the connecting rod and engine is increased.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is a plan view of a connecting rod including a wear resistant coating applied to thrust surfaces according to an example embodiment of the invention.

DESCRIPTION OF THE EXAMPLE EMBODIMENTS

A connecting rod 20 for connecting a piston to a crankshaft, also referred to as a crank throw or crank pin, of an internal combustion engine according to an example embodiment is generally shown in FIG. 1. A wear resistant coating 22 is applied to at least one thrust surface 24, 26 of the connecting rod 20 to provide lubrication and thus reduce wear, scuff, and seizure caused by components contacting the connecting rod 20 as the piston reciprocates and crank shaft rotates during operation of the internal combustion engine.

The connecting rod 20 can comprise various different designs and dimensions depending on the intended application of the connecting rod 20. The body of the connecting rod 20 is formed of metal, typically a steel material. The body extends longitudinally from a first end 28, also referred to as a large end, to a second end 30, also referred to as a small end. A first thrust portion 32 of the body is located adjacent the first end 28, and a second thrust portion 34 is located adjacent the second end 30. A stem 36 connects the first thrust portion 32 to the second thrust portion 34.

The first thrust portion 32 of the connecting rod 20 includes a pair of first thrust surfaces 24 facing opposite one another and encircling a first bore 38 for receiving the crankshaft. The first bore 38 is formed by a first bore surface 40 which extends between and perpendicular to the first thrust surfaces 24. The first bore surface 40 surrounds a first center axis A1 and presents a first diameter D1 sized to receive the crankshaft. In the example embodiment of FIG. 1, the first thrust portion 32 also includes a pair of openings 42 at the first end 28 on opposite sides of the first bore 38 for receiving fasteners 44, and a bearing cap 46 is located at the first end 28 between the openings 42.

The second thrust portion 34 includes a pair of second thrust surfaces 26 facing opposite one another and encircling a second bore 48 for receiving a wrist pin which couples the connecting rod 20 to a pin bore of the piston. The second bore 48 is formed by a second bore surface 50 extending between and perpendicular to the second thrust surfaces 26. The second bore surface 50 surrounds a second center axis A2 parallel to the first center axis A1 and presents a second diameter D2. The second diameter D2 is smaller than the first diameter D1 and is sized to receive the wrist pin.

The wear resistant coating 22 is applied to at least one of the thrust surfaces 24, 26 of the connecting rod 20. The wear resistant coating 22 can also be applied to at least one of the bore surfaces 40, 50 of the connecting rod 20. In the example embodiment of FIG. 1, the wear resistant coating 22 is applied to each of the thrust surfaces 24, 26 and each of the bore surfaces 40, 50. The wear resistant coating 22 can be applied by various different methods. Typically, the wear resistant coating 22 is applied to a thickness of 5 to 50 microns, and preferably 5 to 20 microns.

The composition of the wear resistant coating 22 includes polymer, solid lubricant, and particles formed of $Fe_2O_3$. Example compositions which can be used as the wear resistant coating 22 are disclosed in U.S. patent application Ser. No. 13/142,887 and U.S. patent application Ser. No. 13/661,598, which are incorporated herein by reference in their entirety.

The polymer typically forms a matrix of the wear resistant coating 22. The wear resistant coating 22 includes the polymer in an amount of at least 40.0 volume percent (vol. %), or at least 50 vol. %, or at least 60 vol. %, or at least 80 vol. %, or at least 85 vol. %, based on the total volume of the wear resistant coating 22. The polymer matrix can be formed of a single polymer or a mixture of polymers, resin, plastics, or duroplastics, and either thermoplastic or thermoset polymers. The polymer matrix can also include synthetic and cross-linked polymers. Preferably, the polymer matrix has a high temperature resistance and excellent chemical resistance. The polymer matrix typically has a melting point of at least 210° C., preferably at least 220° C., or at least 230° C., or at least 250° C. In one embodiment, the polymer matrix includes at least one of polyarylate, polyetheretherketone (PEEK), polyethersulfone (PES), polyamide imide (PAI), polyimide (PI), expoxy resin, polybenzimidazole (PBI), and silicone resin. In another embodiment, the polymer matrix includes a bonding agent, such as an unsaturated polyester resin or silicone, hardened by means of UV radiation. In the example embodiment, the polymer consists of polyamide imide (PAI), and the polyamide imide (PAI) is present in an amount of at least 85.0 vol. %, based on the total volume of the wear resistant coating 22.

The solid lubricant of the wear resistant coating 22 is typically present in an amount of 5.0 to 40.0 vol. %, or 5.0 to 30.0 vol. %, or up to 30.0 vol. %, or up to 9.5 vol. %, based on the total volume of the wear resistant coating 22. The solid lubricant is typically formed of one or more of the following components: $MoS_2$, graphite, $WS_2$, hexagonal boron nitride (h-BN), PTFE, and metal sulfides with layered structures.

The wear resistant coating 22 also includes hard particles, at least some of which include the $Fe_2O_3$ particles. The hard particles are typically formed of a material having a hardness of at least 600 HV/0.5, more preferably at least 620 HV/0.5, and even more preferably at least 650 HV/0.5, at a temperature of 25° C. The hard particles also have a particle size sufficient to affect at least one of the ductility, wear resistance, and strength of the coating. In one embodiment, the hard particles have a D50 particle size by volume not greater than 10.0 microns, or not greater than 8.0 microns, or not greater than 6.0 microns, and preferably from 0.1 to 5.0 microns. The D50 particle size by volume is the equivalent spherical diameter of the hard particles, also referred to as a D50 diameter, wherein 50.0 wt. % of the hard particles have a larger equivalent spherical diameter and 50.0 wt. % of the hard particles have a smaller equivalent spherical diameter. The D50 diameter is determined from a particle size distribution display of the hard particles, before any processing of the hard particles following common testing practice. In one embodiment, the hard particles include a mixture of particle sizes, such as a first group of particles having a smaller particle size than a second group of particles. The first and second groups of the hard particles are typically dispersed evenly throughout the polymer matrix.

In addition to the $Fe_2O_3$ particles, the hard particles of the wear resistant coating 22 can also include at least one of metal nitrides, such as such as cubic BN, and $Si_3N_4$; metal carbides, such as SiC and $B_4C$; metal oxides, such as $TiO_2$ and $SiO_2$; metal silicides, such as $MoSi_2$; metal borides; metal phosphides, such as $Fe_3P$; intermetallic compounds; metal oxynitrides; metal carbonitrides; metal oxycarbides; and metal powders of Ag, Pb, Au, SnBi and/or Cu.

The wear resistant coating 22 typically includes the hard particles in an amount of 0.1 to 20.0 vol. %, or 3.0 to 8.0 vol. %, based on the total volume of the wear resistant coating 22. In the example embodiment, the wear resistant coating 22 includes the $Fe_2O_3$ particles having a D50 particle size of 0.1 to 5.0 microns in an amount of 0.1 to 15.0 vol. %, or 0.5 to 8.0 vol. %, based on the total volume of the wear resistant coating 22. The additional hard particles, which are different from the $Fe_2O_3$ particles, are typically present in an amount up to 5.0 vol. %, or 3.0 to 5.0 vol. %, based on the total volume of the wear resistant coating 22.

The wear resistant coating 22 is applied to at least one of the thrust surfaces 24, 26, and optionally at least one of the bore surfaces 40, 50, as a liquid or a powder. The liquid or powder can be applied by spraying or rolling, but could alternatively by applied by dipping, brushing, atomizing, or printing. The wear resistant coating 22 can be applied directly to the metal surfaces 24, 26, 40, 50 of the connecting rod 20, or another coating could optionally be disposed between the metal surfaces 24, 26, 40, 50 and the wear resistant coating 22. For example, a primer could be applied before the wear resistant coating 22. In another example, a layer of the polymer without the $Fe_2O_3$ particles or solid lubricant is applied before or after applying the wear resistant coating 22.

Typically, one or two layers of the wear resistant coating 22 are applied to the thrust surfaces 24, 26 and bore surfaces 40, 50 of the connecting rod 20 such that the wear resistant coating 22 has a total thickness of 5 to 50 microns. However, additional layers could be applied, and the compositions of the layers could be the same or different from one another. In one example embodiment, several layers of the wear resistant coating 22 are applied to the surfaces 24, 26, 40, 50 as a gradient, with the layer properties continuously changing over the thickness of the wear resistant coating 22. For example, the amount of hard particles could be higher in a base layer than in a top layer, or higher in a top layer than in a base layer.

A method of manufacturing the connecting rod 20 with the wear resistant coating 22 shown in FIG. 1 is also provided. The method generally includes providing the body with the thrust surfaces 24, 26 and bores 38, 48, and applying the wear resistant coating 22 to at least one of the metal thrust surfaces 24, 26. The step of providing the body typically includes casting or forging the metal material into the desired shape and dimensions. The method then includes applying the wear resistant coating 22 to at least one of the thrust surfaces 24, 26, for example by spraying, rolling, dipping, brushing, atomizing, or printing.

In the example embodiment, the method first includes ultrasonic cleaning and then drying the surfaces 24, 26, 40, 50 of the metal body to which the wear resistant coating 22 will be applied. The cleaning step is typically conducted for about 30 seconds, followed by air drying for about 5 minutes. The example method next includes sand blasting the surfaces 24, 26, 40, 50 of the metal body to be coated. Typically, two passes of the sand blasting procedure is sufficient. The loose metal material is then blown off with air, and the sand blasted metal body is again subjected to ultrasonic cleaning for an additional 30 seconds.

Once the surfaces 24, 26, 40, 50 of the connecting rod 20 are prepared, the wear resistant coating 22 is applied. In the example embodiment, the step of applying the wear resistant coating 22 includes spraying the wear resistant coating 22 in liquid form onto the thrust surfaces 24, 26 and the bore surfaces 40, 50 using a hand-held air brush spray applicator. Two spray passes using air at 38-40 PSI are performed, followed by a 15 second hot air polymer drying operation, and then another two spray passes and 15 second hot air polymer drying operation.

After applying the wear resistant coating 22, the method includes curing the wear resistant coating 22 on the connecting rod 20 in a forced air oven for about 30 minutes at about 200° C. The connecting rod 20 is hung vertically in the oven, with support in the second end 30. After being removed from the oven, the coated connecting rod 20 is air cooled for about 30 minutes.

EXPERIMENT

An experiment was conducted to test the adhesion of the wear resistant coating 22 to the thrust surfaces 24, 26 of the connecting rod 20. The connecting rod 20 tested was formed of steel and included a rod split joint 52. The wear resistant coating 22 included a polymer matrix formed of PAI, Fe2O3 particles, and solid lubricant. The wear resistant coating 22 was applied to the first thrust surface 24 and the second thrust surface 26 according to the example method described above. During the sand blasting and coating process, bearings were installed in the bores 38, 48 to shield the bore surfaces 40, 50 from the media of the blasting process.

The condition of the rod split joint 52 was documented before and after the coating process, as well as before and after opening the connecting rod 20 to remove the bearings. The coated thrust surfaces 24, 26 of the connecting rod 20 were evaluated, and the test results showed that the wear resistant coating 22 did not flake off along the rod cracking interface. An adhesion test, also referred to as a tape test, was then performed on one of the coated thrust surfaces 24, 26 per a standard polymer bearing adhesion test procedure. According to the procedure, a strip of tape was applied to a portion of the coated thrust surface and then removed. Only small dots of the wear resistant coating 22 were removed by the tape, and none of the wear resistant coating 22 was removed due to scoring. In addition, the connecting rods 20 were cracked opened, and the wear resistant coating 22 split nicely along the edge where the rods had been cracked. No peeling of the wear resistant coating 22 was observed at the crack interface. Thus, the test results indicate that the wear resistant coating 22 should achieve an acceptable level of adhesion when used in the intended engine application.

Obviously, many modifications and variations of the present invention are possible in light of the above teachings and may be practiced otherwise than as specifically described while within the scope of the appended claims.

What is claimed is:

1. A method of manufacturing a connecting rod for connecting a crankshaft to a piston of an internal combustion engine, comprising the steps of:

providing a body formed of metal extending longitudinally from a first end to a second end, the body including a first thrust portion adjacent the first end and a second thrust portion adjacent the second end and a stem connecting the first thrust portion to the second thrust portion, the first thrust portion including a pair of first thrust surfaces facing opposite one another and encircling a first bore for receiving a crankshaft, the first thrust portion including a joint, and the second thrust portion including a pair of second thrust surfaces facing opposite one another and encircling a second bore for receiving a wrist pin;

sand blasting the joint and at least one of the first thrust surfaces; and spraying a wear resistant coating onto at least the joint of the first thrust portion and at least one of the first thrust surfaces along the joint of the body which are sand blasted, the wear resistant coating including polymer, solid lubricant, and particles formed of $Fe_2O_3$, and further including ultrasonic cleaning and drying the joint and the at least one first thrust surface prior to the sand blasting step, ultrasonic cleaning the joint and the at least one first thrust surface after the sand blasting step, and wherein the spraying step includes spraying the wear resistant coating in liquid form onto the joint and the at least one first thrust surface, the spraying step includes applying the wear resistant coating to a thickness of 5 to 50 microns, drying the wear resistant coating after the spraying step, repeating the spraying step, drying the wear resistant coating after repeating the spraying step, and curing the wear resistant coating in an oven.

2. The method of claim 1, wherein the bores are formed by bore surfaces extending perpendicular to the thrust surfaces, and further including the step of applying the wear resistant coating to at least one of the bore surfaces.

3. The method of claim 1, wherein the wear resistant coating includes the polymer in an amount of at least 40 vol. %, the solid lubricant in an amount of 5.0 to 40.0 vol. %, and the $Fe_2O_3$ particles in an amount of 0.1 to 15.0 vol. %, based on the total volume of the wear resistant coating.

4. The method of claim 3, wherein the polymer includes at least one of polyarylate, polyetheretherketone (PEEK), polyethersulfone (PES), polyamide imide (PAI), polyimide (PI), epoxy resin, polybenzimidazole (PBI), silicone resin, polyester, and silicone; the solid lubricant includes at least one of $MoS_2$, graphite, $WS_2$, hexagonal boron nitride (h-BN), PTFE, and metal sulfides; and the $Fe_2O_3$ particles have a D50 particle size of 0.1 to 5.0 microns.

5. The method of claim 4, wherein the polymer includes polyamide imide (PAI) in an amount of at least 85 vol. %, based on the total volume of the wear resistant coating; the solid lubricant includes one or more components selected from: $MoS_2$, graphite, $WS_2$, hexagonal boron nitride (h-BN), PTFE, and metal sulfides in a total amount of 5.0 to 30.0 vol. %, based on the total volume of the wear resistant coating; and the $Fe_2O_3$ particles have a D50 particle size of 0.1 to 5.0 microns and are present in an amount of 3.0 to 8.0 vol. %, based on the total volume of the wear resistant coating.

6. The method of claim 1, wherein the spraying steps are conducted using an air brush spray applicator, and the drying step after each of the spraying steps are conducted using a hot air polymer drying operation.

\* \* \* \* \*